United States Patent
Nagai et al.

(10) Patent No.: US 9,162,618 B2
(45) Date of Patent: Oct. 20, 2015

(54) ILLUMINATING STRUCTURE OF ROOM LAMP WITH ACTUATION BY SUN VISOR

(75) Inventors: Kentarou Nagai, Makinohara (JP); Haruhito Ohtsuka, Makinohara (JP); Ryouhei Ochiai, Fujieda (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/611,097

(22) Filed: Sep. 12, 2012

(65) Prior Publication Data

US 2013/0003395 A1   Jan. 3, 2013

Related U.S. Application Data

(63) Continuation of application No. PCT/JP2011/056983, filed on Mar. 23, 2011.

(30) Foreign Application Priority Data

Mar. 24, 2010   (JP) .................................. 2010-068520

(51) Int. Cl.
*B60Q 3/02* (2006.01)

(52) U.S. Cl.
CPC ............ *B60Q 3/0226* (2013.01); *B60Q 3/0203* (2013.01); *B60Q 3/0293* (2013.01)

(58) Field of Classification Search
CPC .. B60Q 3/0226; B60Q 3/0203; B60Q 3/0296; B60Q 3/0293
USPC .......................... 362/488, 492, 490, 155, 493
See application file for complete search history.

(56) References Cited

U.S. PATENT DOCUMENTS

| | | | | |
|---|---|---|---|---|
| 1,746,810 | A | * | 2/1930 | Anderson ..................... 362/155 |
| 2,060,062 | A | * | 11/1936 | Fischer .......................... 362/492 |
| 5,207,501 | A | | 5/1993 | Sakuma et al. |
| 5,331,525 | A | * | 7/1994 | Lawassani et al. ........... 362/140 |
| 5,442,530 | A | * | 8/1995 | Viertel et al. ................. 362/137 |
| 6,203,161 | B1 | * | 3/2001 | Busch et al. .................. 359/844 |
| 6,742,917 | B2 | * | 6/2004 | Okano et al. .................. 362/492 |

(Continued)

FOREIGN PATENT DOCUMENTS

| | | |
|---|---|---|
| JP | 4710386 | 4/1972 |
| JP | 58164146 U | 11/1983 |
| JP | 1123715 U | 8/1989 |

(Continued)

OTHER PUBLICATIONS

International Search Report (PCT/ISA/210) dated Jun. 28, 2011, issued by the International Searching Authority in corresponding International Application No. PCT/JP2011/056983.

(Continued)

*Primary Examiner* — Robert May
(74) *Attorney, Agent, or Firm* — Sughrue Mion, PLLC

(57) ABSTRACT

It has a sun visor 10 arranged in the vehicle roof portion so that it can be rotated between the working position and the stored position, a room lamp 20 arranged in the vehicle roof portion and covered by the sun visor 10 stored at the stored position, and a lamp-turning-on/off switch (lens) 20L of the room lamp arranged on the room lamp itself or near it; the lens 20L can be turned between the on position and the off position and, when the lens 20L is in the on position (inclined posture) 20n, if the sun visor 10 is in the stored position, the sun visor 10 drives the lens 20L physically from the on position to the off position (horizontal posture) 20h.

2 Claims, 14 Drawing Sheets

(56) References Cited

U.S. PATENT DOCUMENTS

| | | | | |
|---|---|---|---|---|
| 8,038,331 | B2* | 10/2011 | Kino et al. | 362/492 |
| 2009/0027905 | A1* | 1/2009 | Chang | 362/492 |

FOREIGN PATENT DOCUMENTS

| | | | |
|---|---|---|---|
| JP | 4146831 | A | 5/1992 |
| JP | 6127272 | A | 5/1994 |
| JP | 2002225554 | A | 8/2002 |
| JP | 2004243970 | A | 9/2004 |
| JP | 2009161143 | A | 7/2009 |
| JP | 2009-241885 | A | 10/2009 |

OTHER PUBLICATIONS

Written Opinion (PCT/ISA/237) of the International Searching Authority, dated Jun. 28, 2011, issued in corresponding International Application No. PCT/JP2011/056983.

Office Action dated Oct. 25, 2013 issued by the Korean Intellectual Property Office in counterpart Korean Application No. 1020127024147.

Office Action dated May 8, 2014, issued by the Japanese Patent Office in counterpart Japanese Application No. 2010-068520.

Notice of Decision of Rejection, dated Apr. 14, 2014, issued by the Korean Intellectual Property Office in counterpart Korean Application No. 10-2012-7024147.

Office Action dated Feb. 28, 2014 issued by the German Patent Office in counterpart German Patent Application No. 11 2011 101 000.1.

Office Action, dated Feb. 4, 2014, issued by the Japanese Patent Office in counterpart Japanese Patent Application No. 2010-068520.

Communication dated Jun. 12, 2014 from the State Intellectual Property Office of P.R. China in a counterpart application No. 201180015597.1.

Notice of Allowance dated Apr. 14, 2015 issued by the Korean Intellectual Property Office in counterpart Korean Patent Application No. 10-2014-7019602.

Communication issued on Apr. 22, 2015 by the Korean Intellectual Property Office in related Application No. 10-2012-7024147.

Office Action dated Jan. 26, 2015, issued by the State Intellectual Property Office of the People's Republic of China in counterpart Chinese Application No. 201180015597.1.

Office Action dated Jun. 24, 2015, issued by the State Intellectual Property Office of the People's Republic of China in counterpart Chinese Patent Application No. 201180015597.1.

Office Action dated Jul. 7, 2015, issued by the Japanese Patent Office in counterpart Japanese Patent Application No. 2010-68520.

* cited by examiner

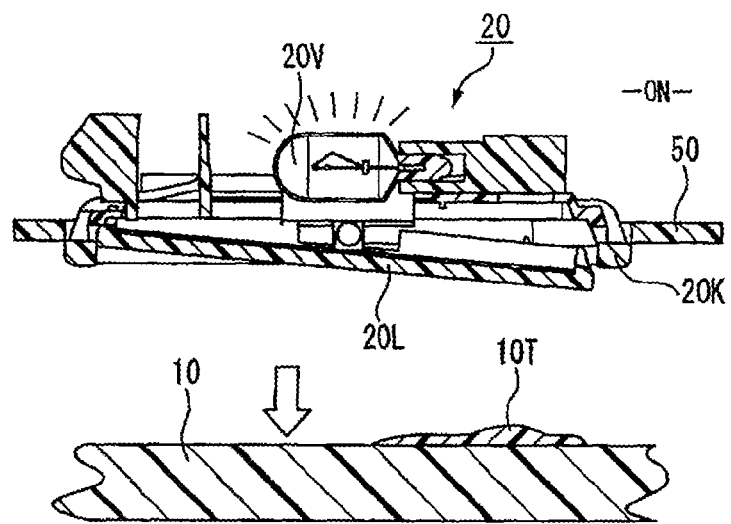
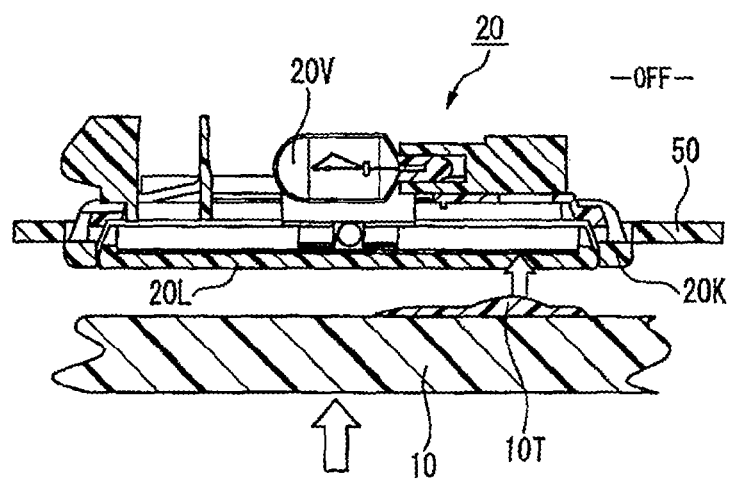

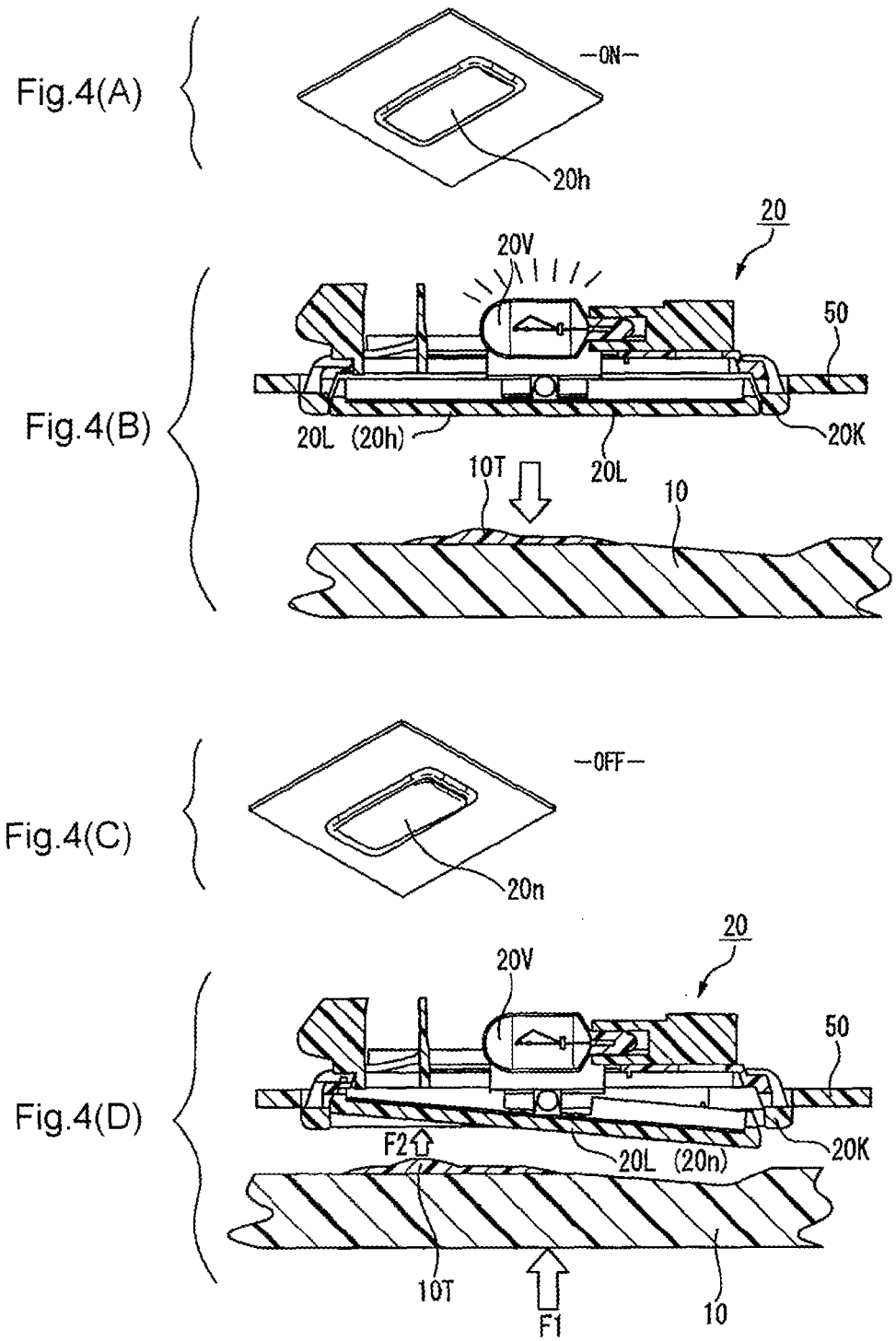

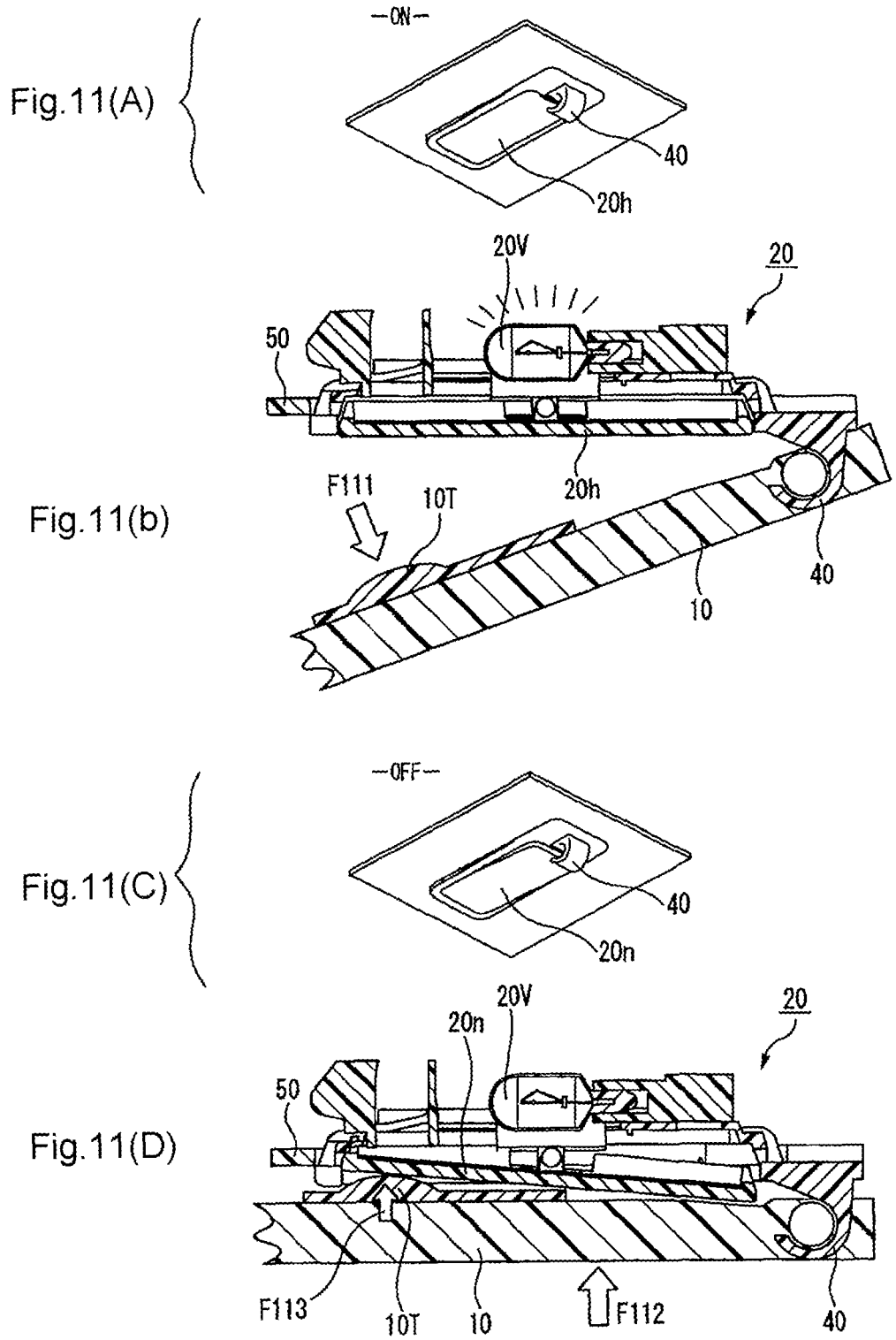

ILLUMINATING STRUCTURE OF ROOM LAMP WITH ACTUATION BY SUN VISOR

CROSS REFERENCE TO RELATED APPLICATION

This application is a continuation of PCT application No. PCT/JP2011/056983, which was filed on Mar. 23, 2011 based on Japanese Patent Application (No. 2010-068520) filed on Mar. 24, 2010, the contents of which are incorporated herein by reference. Also, all the references cited herein are incorporated as a whole.

BACKGROUND OF THE INVENTION

1. Field of the Invention

The present invention relates to the illuminating structure of a room lamp such that the automobile room lamp in the ON state is turned off when the sun visor is stored. More specifically, the present invention relates to the illuminating structure of a room lamp, which can be turned on/off by any operation of the user and which can be reliably turned off when the sun visor is stored.

2. Description of the Related Art

As an illumination device in the cabin of a vehicle, there are the map lamp and vanity lamp in the prior art. The map lamp is installed on the vehicle roof portion above the vehicle width-direction center of the instrument panel. On the other hand, the vanity lamp is attached on the back surface of the sun visor. Later, the map lamp and vanity lamp, which are independently attached, are replaced by a single room lamp that is shared in use. The illuminating structure of the room lamp is of the following three types.

(1) A type in which the room lamp is arranged at the stored position of the sun visor; it is automatically turned off when the sun visor is stored, and it is then automatically turned on when the sun visor is in use (see Patent Reference 1).

(2) A type in which the room lamp is arranged at the stored position of the sun visor; it is automatically turned on for use as a vanity lamp when the sun visor is in use; then it can be used as a map lamp when the sun visor is stored (see Patent Reference 2).

(3) A type wherein the room lamp is attached on the main body of the sun visor (see Patent Reference 3).

Merits and Demerits of the Invention Described in Patent Reference 1

According to the invention described in Patent Reference 1, the room lamp is arranged at the stored position of the sun visor. When the sun visor is stored at the stored position, the switch of the room lamp continues to be pressed by one end of the sun visor so that the room lamp is kept turned off. When the sun visor is in use, as the sun visor is turned out from the stored position, the switch of the room lamp that has been pressed until that time by an end of the sun visor is released, so that the room lamp is turned on to illuminate the cabin of the vehicle. According to the invention described in Patent Reference 1, the room lamp is automatically turned on/off as it is interlocked to the open/close movement of the sun visor. This is convenient. On the other hand, however, the lamp itself cannot be manually manipulated (problem A). In addition, if the sun visor shifts up, the room lamp is turned on again.

Merits and Demerits of the Invention Described in Patent Reference 2

According to the invention described in Patent Reference 2, the room lamp is arranged at the stored position of the sun visor. When the sun visor is stored at the stored position, the switch of the room lamp is pressed by an end of the sun visor so that the room lamp is turned off. When the sun visor is in use, as the sun visor is turned out from the stored position, the switch of the room lamp, which continues to be pressed up to that time by an end of the sun visor, is released so that the room lamp is turned on to illuminate the cabin of the vehicle.

In addition, according to the invention described in Patent Reference 2, a through port and a slide for opening/closing the through port are arranged on the sun visor. When the slide is moved, the through port is opened and, at the same time that the slide moves, the switch is closed so that the room lamp is automatically turned on and light passes through the through port into the cabin of the vehicle. When the slide is moved to close the through port, as the slide moves, the switch is opened, so that the room lamp is automatically turned off. According to the invention described in Patent Reference 2, the room lamp is automatically turned on/off interlocked to the opening/closing movement of the sun visor and, at the same time, the room lamp can be automatically turned off even when the slide is moved. This is convenient. However, because a through port has to be arranged on the sun visor, and a slide and a switch have to be arranged in the interior, the sun visor becomes complicated. As the structure of the sun visor becomes complicated, it is prone to problems and the cost rises (problem B).

In addition, although the circuit can be made simpler by turning on/off the lamp by a switch arranged separately instead of turning on/off of the lamp interlocked to the movement of the slide, as the lamp is hidden in the sun visor and the slide, the user may forget to turn off the hidden lamp, which is kept on (problem C).

Merits and Demerits of the Invention Described in Patent Reference 3

According to the invention described in Patent Reference 3, the room lamp is attached on the main body of the sun visor. Consequently, the operability is excellent and there is no way that the user can forget that the lamp remains on. However, in this case, it is necessary to arrange an electric circuit in the sun visor arm portion. As a result, the structure becomes complicated, and it is prone to problems. Also, the price rises (problem B).

Patent Reference 1: JP-UM-A-1-123715
Patent Reference 2: JP-A-2009-161143
Patent Reference 3: JP-A-6-127272

SUMMARY OF THE INVENTION

The purpose of the present invention is to solve the problems of the prior art by providing an illuminating structure of a room lamp, wherein the lamp itself allows manual manipulation so that the user will not forget to turn off the lamp, there is no need to arrange an electric circuit in the sun visor arm portion, and the structure is simple so that problems hardly take place and the cost can be cut.

In order to realize the purpose, the first invention of the present patent application has the following features: it has a sun visor arranged in the vehicle roof portion and is rotatable between the working position and the stored position, a room lamp arranged in the vehicle roof portion and covered by the sun visor stored at the stored position, and an on/off switch for turning on/off the room lamp and arranged on the room lamp itself or near it; the switch can be turned between the on position and off position; when the switch is at the on position, if the sun visor is stored at the stored position, due to the sun visor, the switch is physically turned from the on position to the off position.

The second invention relates to the first invention, wherein the switch is a seesaw switch or slide switch that can be turned between the on position and the off position; a protrusion is arranged on the sun visor; when the sun visor is stored at the stored position, the protrusion turns the switch from the on position to the off position.

The third invention relates to the first invention, wherein a hook that supports the end portion side of the sun visor is integrally provided with the same case as the switch.

As explained above, for the illuminating structure of a room lamp according to the present invention, the lamp itself can be manually manipulated, the user will not forget to turn off the lamp, and there is no need to arrange an electric circuit in the sun visor portion; the structure is simple so that problems hardly take place and the cost can be cut.

In addition, once the switch is turned off, there is no way that the room lamp would be re-turned on.

BRIEF DESCRIPTION OF THE DRAWINGS

FIG. 3(A) and FIG. 3(B) illustrate Example 2 for more reliably turning off the lamp. FIG. 3(A) is a vertical cross-sectional view corresponding to FIG. 1(C); FIG. 3(B) is a vertical cross-sectional view corresponding to FIG. 2(C).

FIG. 4(A) through FIG. 4(D) illustrate the on/off operation in relation to Example 3 when a lamp of the reversed type is turned off. FIG. 4(A) is an overall oblique view of the lamp in the on state. FIG. 4(B) is a cross-sectional view corresponding to FIG. 3(A). FIG. 4(C) is an overall oblique view of the lamp in the off state. FIG. 4(D) is a cross-sectional view corresponding to FIG. 3(B).

FIG. 6(A) is a plane view illustrating the decorative surface of the lamp in relation to Example 4. FIG. 6(B) is a plane view illustrating the functional portion on the back surface of the decorated portion of the lamp. FIG. 6(C) is a plane view illustrating the state in which the sun visor is opened.

FIG. 7(A) shows the state in which the sun visor is opened; FIG. 7(B) shows the state in which the sun visor is closed.

FIG. 9(A) is a cross-sectional view taken across IX(A)-IX(A) of FIG. 8(A) (vertical cross-sectional view). FIG. 9(B) is an oblique view illustrating the lamp when the switch of the lamp concurrently used as a switch is turned off. FIG. 9(C) is an oblique view illustrating the lamp when the lamp concurrently used as a switch is turned on.

FIG. 10(A) shows the state in which the sun visor engaged with the hook is opened. FIG. 10(B) shows the state in which the sun visor engaged with the hook is closed.

FIG. 11(A) through FIG. 11(D) illustrate the principle of turning off of the lamp of the reversed type with respect to the on/off operation by the sun visor engaged with the hook in Example 6. FIG. 11(A) is an overall oblique view of the lamp in the state in which the sun visor engaged with the hook is opened. FIG. 11(B) is a cross-sectional view of FIG. 11(A). FIG. 11(C) is an overall oblique view of the lamp in the state in which the sun visor engaged with the hook is closed. FIG. 11(D) is a cross-sectional view of FIG. 11(C).

FIG. 12(A) shows the state in which the sun visor is in use; FIG. 12(B) shows the state in which the sun visor is stored.

FIG. 13(A) is an oblique view as viewed from the lower side obliquely of the lamp attached on the roof portion housing. FIG. 13(B) is a plane view illustrating the state in which the lamp is arranged laterally as viewed from the driver when the lamp is attached on the roof. FIG. 13(C) is a plane view illustrating the operation state in which the lamp is arranged vertically as viewed from the driver when the lamp is attached on the roof.

FIG. 14(A) is a cross-sectional view taken across XIV(A)-XIV(A) in FIG. 13(A) (a vertical cross-sectional view). FIG. 14(B) is an oblique view illustrating the lamp when the switch of the lamp concurrently used as a switch is turned off. FIG. 14(C) is an oblique view illustrating the lamp when the lamp concurrently used as a switch is turned off.

DESCRIPTION OF THE PREFERRED EMBODIMENTS

In the following, an explanation will be presented on the illuminating structure of the room lamp of the present invention with the following features: it allows manual manipulation of the lamp itself, the user will not forget to turn off the lamp, the structure is simple so that problems hardly take place, and the cost can be cut.

Position Relationship Between the Lamp and the Sun Visor

Figure 12A:
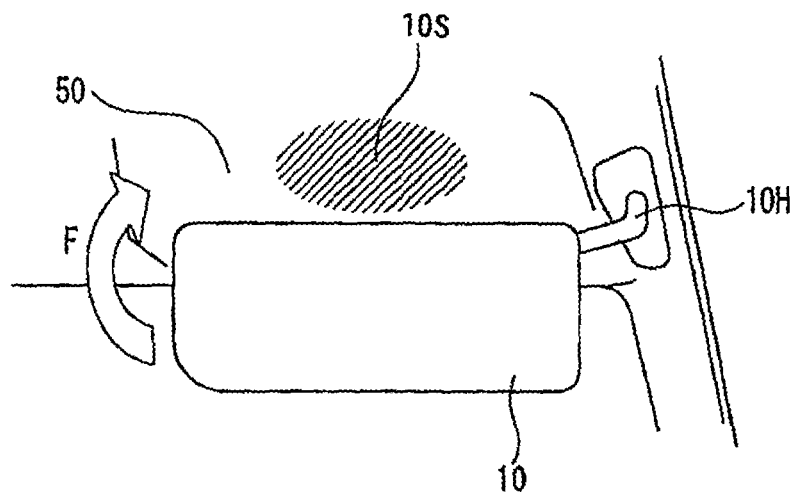
FIG. 12(A) and FIG. 12(B) are front views illustrating the position relationship between the conventional well-known lamp and the sun visor for which the present invention is to be adopted.
Figure 12B:
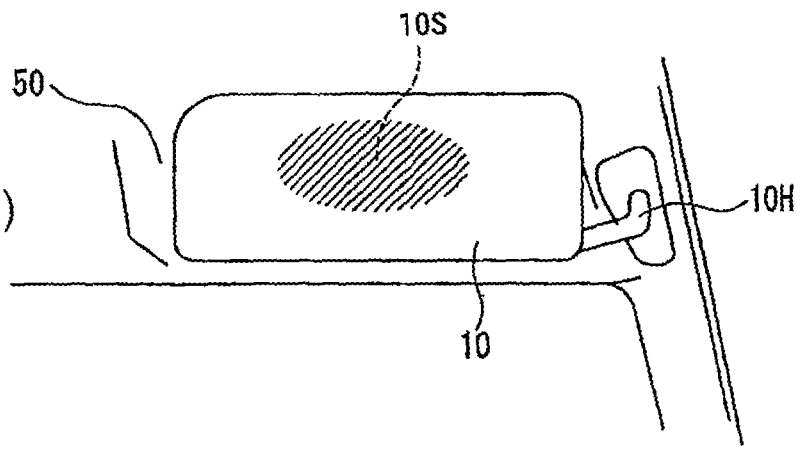

FIG. 12(A) and FIG. 12(B) are front views illustrating the position relationship between the conventional well-known lamp and the sun visor for which the present invention is to be adopted. FIG. 12(A) shows the state in which the sun visor is in use; FIG. 12(B) shows the state in which the sun visor is stored. Here, the sun visor 10 is attached in a rotatable way on the roof portion housing 50 via a rotary supporting part 10H.

When the lamp shown in FIG. 12(A) is adopted, as the sun visor 10 is rotated to the lower side with respect to the rotary supporting part 10H, the lamp attachment position 10S is opened so that the driver can see it and thus the lamp can be turned on/off manually.

Next, as the lamp is to be used, the sun visor 10 is rotated to the upper side with respect to the rotary supporting part 10H in the direction indicated by arrow F shown in FIG. 12(A), the sun visor 10 becomes the closed state as shown in FIG. 12(B). The lamp attachment position 10S is hidden in the sun visor 10, so that the lamp cannot be seen.

Lamp Concurrently Used as a Switch Adopted in the Present Invention

In the following, the lamp adopted in the present invention will be explained.

Figure 13A:
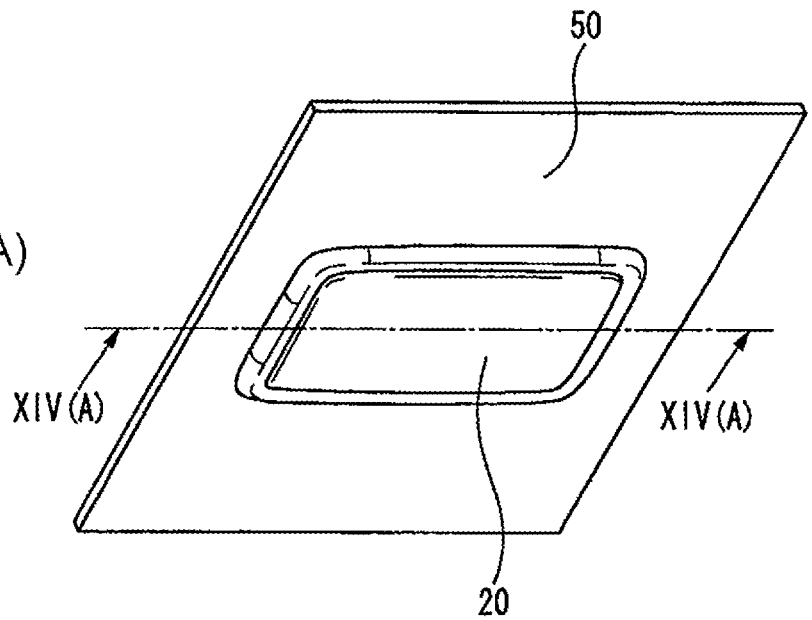
FIG. 13(A) through FIG. 13(C) illustrate the lamp concurrently used as a switch for which the present invention is adopted.
Figure 13B:
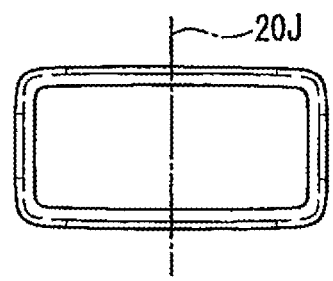
Figure 13C:
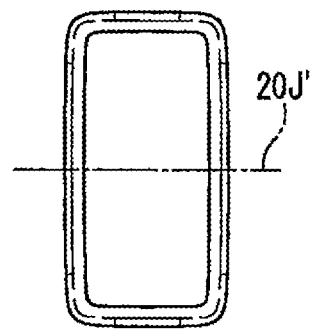

FIG. 13(A) through FIG. 13(C) illustrate the lamp concurrently used as a switch for which the present invention is adopted. FIG. 13(A) is an oblique view as viewed from the lower side obliquely of the lamp attached on the roof portion housing. FIG. 13(B) is a plane view illustrating the state in which the lamp is arranged laterally as viewed from the driver when the lamp is attached on the roof. FIG. 13(C) is a plane view illustrating the operation state in which the lamp is arranged vertically as viewed from the driver when the lamp is attached on the roof.

Figure 14A:
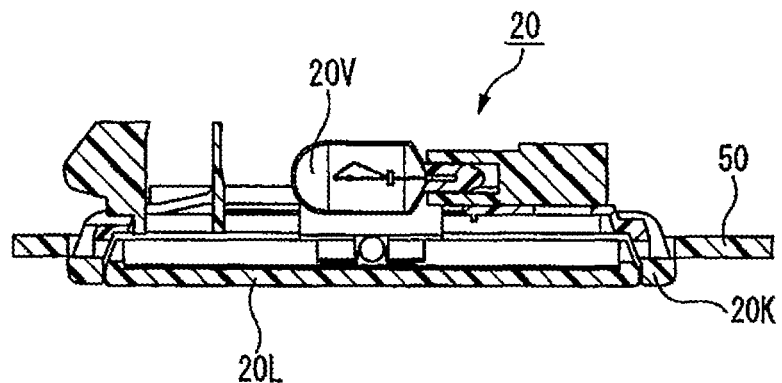
FIG. 14(A) through FIG. 14(C) illustrate the structure of the lamp concurrently used as a switch for which the present invention is adopted.
Figure 14B:
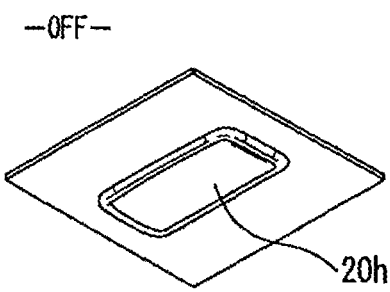
Figure 14C:
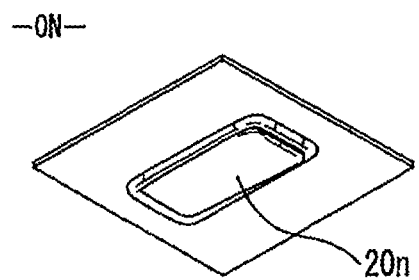

FIG. 14(A) through FIG. 14(C) illustrate the structure of the lamp concurrently used as a switch for which the present invention is adopted. FIG. 14(A) is a cross-sectional view taken across XIV(A)-XIV(A) in FIG. 13(A) (a vertical cross-sectional view). FIG. 14(B) is an oblique view illustrating the lamp when the switch of the lamp concurrently used as a switch (in the following, only "switch" is used when the switch function is explained, while only "lamp" is used when the lamp function is explained) is turned off. FIG. 14(C) is an oblique view illustrating the lamp when the switch of the lamp concurrently used as a switch is turned off.

The lamp 20 shown in FIG. 13(A) through FIG. 13(C) has a switch function due to the seesaw movement between the horizontal posture and the inclined posture around spindle 20J (see FIG. 13(B)) at the center. As shown in FIG. 14(B), when the lamp 20 is in the horizontal posture 20h, the lamp is turned off (lamp is OFF), and, as shown in FIG. 14(C), when the lamp 20 is in the inclined posture 20n, the lamp is turned on (lamp is ON).

Of course, there is also a lamp with the reverse operation. That is, when the lamp 20 is in the horizontal posture 20h, the lamp is turned on (lamp is ON), and when it is in the inclined posture 20n, the lamp is turned off (lamp is OFF) (see FIG. 4(A) through FIG. 4(D)).

Also, the lamp 20 may be any of the following types: a type that is arranged laterally on the roof as shown in FIG. 13(B), and the type that is arranged vertically on the roof as shown in FIG. 13(C). Each of these types undergoes seesaw movement between the horizontal posture and the inclined posture around the spindle 20J (see FIG. 13(B)) and spindle 20J' (see FIG. 13(C)), respectively.

The lamp 20 shown in FIG. 13(A) is arranged laterally as shown in FIG. 13(B) and, because it is in the horizontal posture (see FIG. 14(B)), the lamp is turned off. When the end portion of the lamp 20 in the horizontal posture is lightly touched by a finger tip to press it towards the roof side, it becomes the inclined state (FIG. 14(C)) and the lamp 20 is turned on.

As shown in FIG. 14(A), a vertical cross-sectional view, the lamp 20 is anchored as the lens 20L side faces downward and the housing end portion 20K is inserted into the opening formed on the roof portion housing 50. On the back side of the lens 20L, together with the functional part 20S (see FIG. 6(B)) containing a lamp-turning-on circuit, the bulb 20V is arranged on the back side of the lens. Here, the lens 20L has a switch function and it can perform seesaw movement with respect to the spindle.

Example 1

Turning-Off Operation of the Lamp by the Sun Visor

Figure 1A:
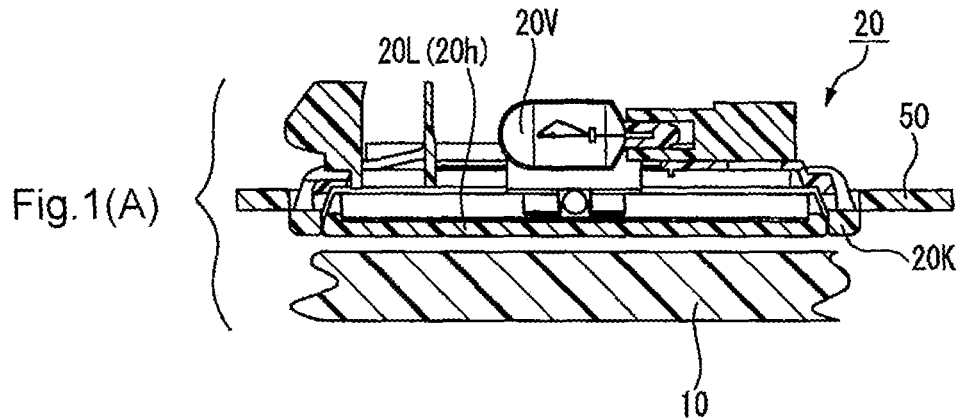
FIG. 1(A) through FIG. 1(C) illustrate the turning on of the lamp in Example 1 of the present invention. They are vertical cross-sectional views illustrating the three steps of operation corresponding to FIG. 1(A), FIG. 1(B), and FIG. 1(C), respectively, until the lamp in the off state is turned on manually.
Figure 1B:
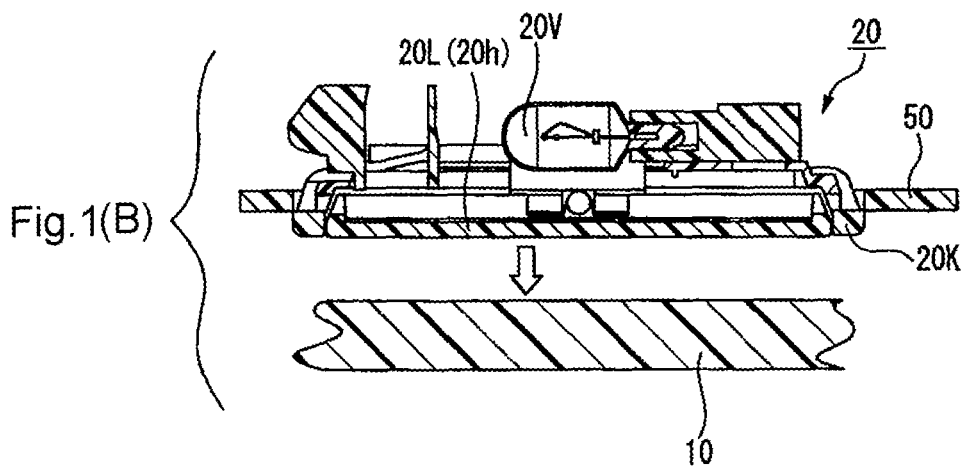
Figure 1C:
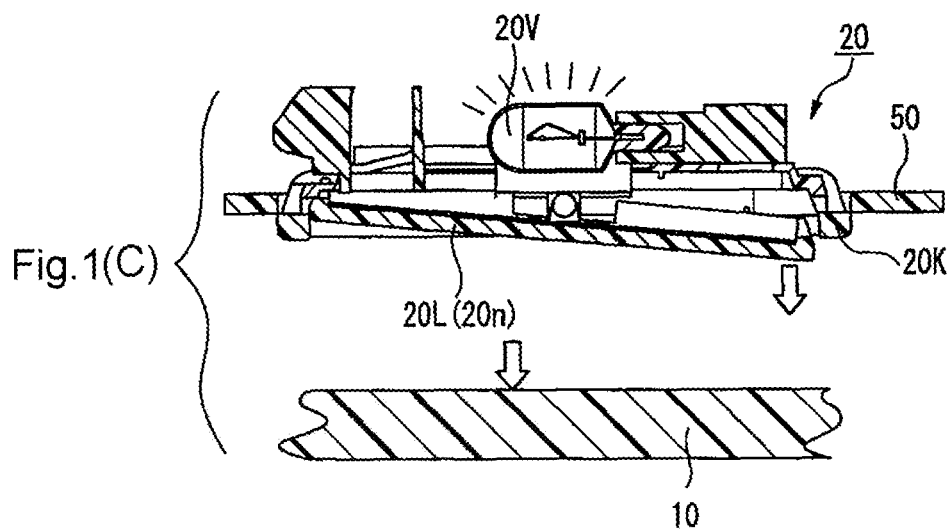

FIG. 1(A) through FIG. 1(C) illustrate turning on of the lamp in Example 1 of the present invention. They are vertical cross-sectional views illustrating the three steps of operation corresponding to FIG. 1(A), FIG. 1(B), and FIG. 1(C), respectively, until the lamp in the off state is turned on manually. FIG. 1(A) is a vertical cross-sectional view illustrating the case in which the sun visor 10 covers the lamp 20 (lamp is OFF), and FIG. 1(B) is a vertical cross-sectional view illustrating the case in which the sun visor 10 is halfway in the process of retreating from the lamp 20 (lamp is OFF). As the sun visor 10 retreats from the lamp 20, the lens 20L is exposed, so that the driver can manually press the lens 20L. FIG. 1(C) is a vertical cross-sectional view illustrating the case in which the sun visor 10 has retreated from the lamp 20; the lens 20L is manually pressed to become the inclined state and the bulb 20V is turned off.

Until Lamp is Turned Off by Manual Manipulation

As shown in FIG. 1(A), while the sun visor 10 is set parallel with and near the lamp 20, the lens 20L in a seesaw movement is set in the horizontal posture 20h by the sun visor 10, so that the lamp is in the off state (see FIG. 14(B)).

As shown in FIG. 1(B), as the sun visor 10 retreats from the lamp 20, the lens 20L becomes capable of undergoing the seesaw movement, and the lamp can be turned on manually.

As shown in FIG. 1(C), after the end of retreat of the sun visor 10 from the lamp 20, the lamp 20 becomes visible to the driver and, as the driver uses a finger to press the end portion of the lens 20L to have it in the inclined posture 20n (see FIG. 14(C)), the bulb 20V is turned on and the cabin of the vehicle is illuminated. Next, when the driver uses a finger to press the end portion on the opposite side of the lens 20L to have it in the horizontal posture 20h (see FIG. 14(B)), the bulb 20V is turned off.

In this way, according to the present invention, the sun visor 10 is arranged in the vehicle roof portion such that it can be rotated between the stored position (see FIG. 1(A)) and the working position (see FIG. 1(C)); also, the lamp 20 is arranged at the position covered by the sun visor 10 when the sun visor 10 is stored at the stored position and, when the sun visor 10 comes in contact with the lamp 20 in seesaw movement, the lens 20L is forced to the horizontal posture so that the lamp 20 becomes the off state.

As the sun visor 10 is separated from the lamp 20, the lens 20L becomes visible to the driver, so that the lens 20L can be pressed. Consequently, it is possible to turn on the lamp manually and it is possible to turn off the lamp manually. As a result, the problem A in the prior art (that is, the fact that it is impossible to carry out the lamp on/off operation manually for the lamp described in Patent Reference 1) is eliminated.

Until the Lamp is Physically Turned Off by the Sun Visor

Figure 2A:
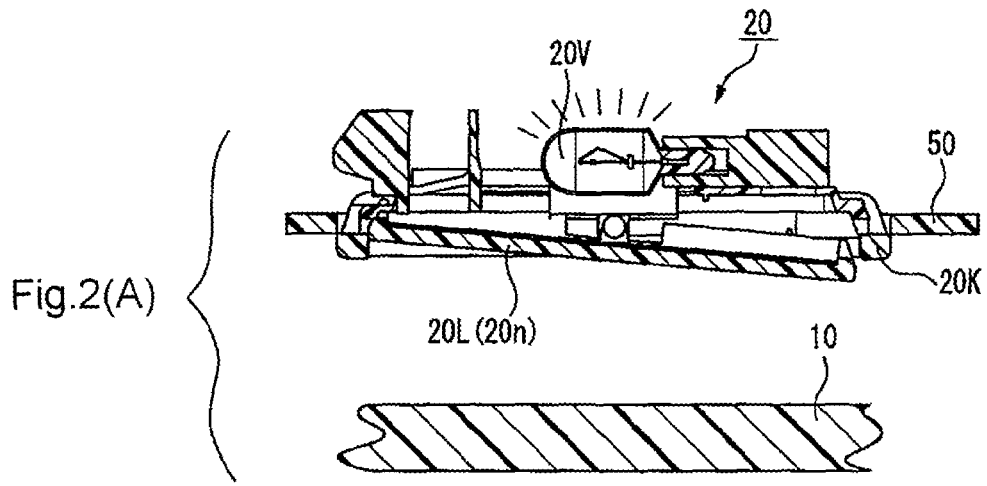
FIG. 2(A) through FIG. 2(C) illustrate the turning off of the lamp in Example 1 of the present invention. They are vertical cross-sectional views illustrating the three steps of operation corresponding to FIG. 2(A), FIG. 2(B), and FIG. 2(C), respectively, until the lamp in the on state is turned off by the sun visor.
Figure 2B:
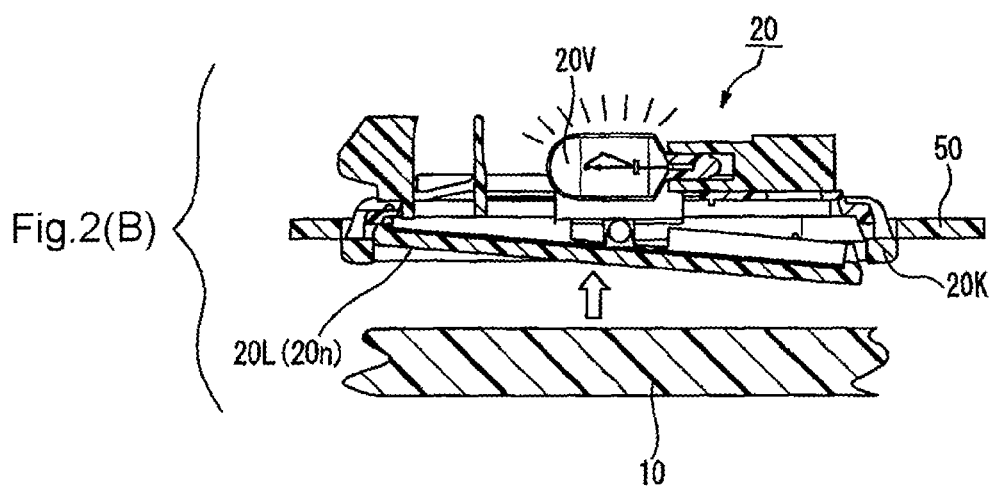
Figure 2C:
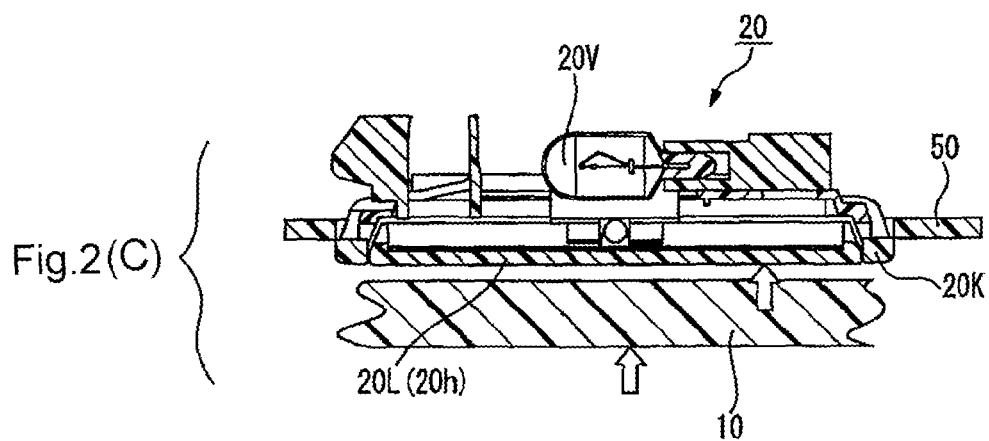

FIG. 2(A) through FIG. 2(C) illustrate turning off of the lamp in Example 1 of the present invention. They are vertical cross-sectional views illustrating the three steps of operation corresponding to FIG. 2(A), FIG. 2(B), and FIG. 2(C), respectively, until the lamp in the on state is turned off by the sun visor.

As shown in FIG. 2(A), because the sun visor 10 is separated from the lamp 20 and the lens 20L is manually pressed to the inclined posture 20n, the bulb 20V is turned on. Because the sun visor 10 is separated from the lamp 20, it is possible to turn off the lamp manually.

As shown in FIG. 2(B), when the sun visor 10 is not used, if the sun visor 10 is reset to the stored position, it starts approaching the lamp 20.

As shown in FIG. 2(C), when the sun visor 10 approaches the lamp 20 in the on state, the lens 20L, which has been in the inclined posture (ON), is forced to set in the horizontal posture 20h the bulb 20V is turned off.

As a result, according to the present invention, when the lens 20L is in the on position (in the inclined posture), once the sun visor 10 is stored at the stored position (see FIG. 2(C)), due to the sun visor 10, the lens 20L is moved physically from the on position (the inclined posture) to the off position (horizontal posture), and the bulb 20V is turned off.

In this way, according to the present invention, because the lens 20L can be turned on by pressing, it is possible to manipulate the lamp itself manually, so that problem A of the prior art can be solved. In addition, problem B of the prior art (that is, because an electric circuit is arranged in the sun visor arm portion according to Patent Reference 3, the structure becomes complicated, problems are prone to take place, and the cost rises) is also eliminated. The cost can be cut and, because the sun visor 10 is stored, the lens 20L is physically moved to the off position by the sun visor 10, so that problem C of the prior art (that is, the user may forget to turn off the lamp) is eliminated.

Consequently, according to Example 1, the present invention is adopted in a lamp that can carry out an on/off operation by itself, the lamp can be turned on/off manually at will, and it is possible to turn off the lamp automatically as the sun visor 10 is stored.

Example 2

Reliable Turning Off of the Lamp 20

FIG. 3(A) and FIG. 3(B) illustrate Example 2 for more reliably turning off the lamp. FIG. 3(A) is a vertical cross-sectional view corresponding to FIG. 1(C); FIG. 3(B) is a vertical cross-sectional view corresponding to FIG. 2(C).

Here, FIG. 3(A) corresponds to FIG. 1(C) and FIG. 3(B) corresponds to FIG. 2(C). The sun visor 10 shown in FIG. 3 differs from the sun visor 10 shown in FIG. 1(A) to FIG. 1(C) and FIG. 2(A) to FIG. 2(C) in that on the back side of the sun visor 10 (on the side facing the lens 20L of the lamp 20), a protrusion 10T is formed at the position facing the end portion of the lens 20L.

As shown in FIG. 3(A), the sun visor 10 retreats from the lamp 20, and the lamp 20 is opened. In this state, the driver can use a finger to lightly touch the end portion of the lens 20L (that is, the switch). As a result, as the finger presses the left end portion of the lens 20L, it changes from the horizontal posture to the inclined posture, and the bulb 20V is turned on as shown in FIG. 3(A).

As shown in FIG. 3(B), as the sun visor 10 approaches the lamp 20, the protrusion 10T on the back side of the sun visor 10 presses the right end portion of the lens 20L, and the bulb 20V can be reliably turned off as shown in FIG. 3(B) before the sun visor 10 and the lens 20L come in contact with each other in a parallel state.

As explained above, according to Example 2, the present invention is adopted in a lamp that can carry out on/off operation itself and the lamp can be turned on/off manually at will; also, because the sun visor 10 is stored, the lamp can be automatically turned off.

Example 3

Turning Off of the Reversed Type Lamp with Respect to the On/Off Operation

FIG. 4(A) through FIG. 4(D) illustrate the on/off operation in relation to Example 3 when a lamp of the reversed type is turned off. FIG. 4(A) is an overall oblique view of the lamp in the on state. FIG. 4(B) is a cross-sectional view corresponding to FIG. 3(A). FIG. 4(C) is an overall oblique view of the lamp in the off state. FIG. 4(D) is a cross-sectional view corresponding to FIG. 3(B).

The sun visor 10 shown in FIG. 4(B) and FIG. 4(D) differs from the sun visor 10 shown in FIG. 3(A) and FIG. 3(B) with respect to the position of the protrusion 10T of the sun visor 10. The protrusion 10T of the sun visor 10 shown in FIG. 3(A) and FIG. 3(B) is at the position where the lens 20L is reset to the horizontal posture. On the other hand, the protrusion 10T of the sun visor 10 shown in FIG. 4(B) and FIG. 4(D) is arranged at the position where the lens 20L in the horizontal posture is changed to the inclined posture.

Here, the lamp 20 adopted in this case is of a type opposite to that of the lamp 20 adopted in Examples 1 and 2, that is, the lamp is turned on in the horizontal posture (see FIG. 4(A)) and the lamp is turned off in the inclined posture (see FIG. 4(B)).

Here, supposing that the lens 20L is in the inclined posture (see FIG. 4(C)) and is turned off, and the sun visor 10 is sufficiently retreated from the lamp 20, the lamp 20 is exposed. Consequently, the driver can manually press the end portion of the lamp 20 to set it in the horizontal posture. As a result, as the lamp 20 is set in the horizontal posture manually, the bulb 20V is turned on as shown in FIG. 4(A) and FIG. 4(B). Also, when the driver manually presses the end portion on the opposite side of the lamp 20 to set it in the inclined posture, the lamp 20 can be turned off.

For the sun visor 10 shown in FIG. 4(B), when the sun visor 10 is in the state retreating from the lamp 20, as the side of the sun visor 10 opposite to the lamp 20 is pressed in the direction indicated by arrow F1 as shown in FIG. 4(D), the sun visor 10 approaches the lamp 20 and, finally, the protrusion 10T on the back side of the sun visor 10 comes in contact with the left end portion of the lens 20L in the horizontal posture and located in the direction indicated by the arrow F2, then presses it. As a result, the lens 20L, which has been in the horizontal posture and is on, is inclined, then the bulb 20V is turned off as shown in FIG. 4(D).

In this way, according to Example 3, the present invention also can be adopted in the reversed type lamp with respect to the on/off operation. For this type of lamp, too, it is possible to turn on/off the lamp manually at will and the lamp can be automatically turned off as the sun visor 10 is stored.

Example 4

Turning Off of the Lamp of a Type Having a Separate Switch

Figure 5:
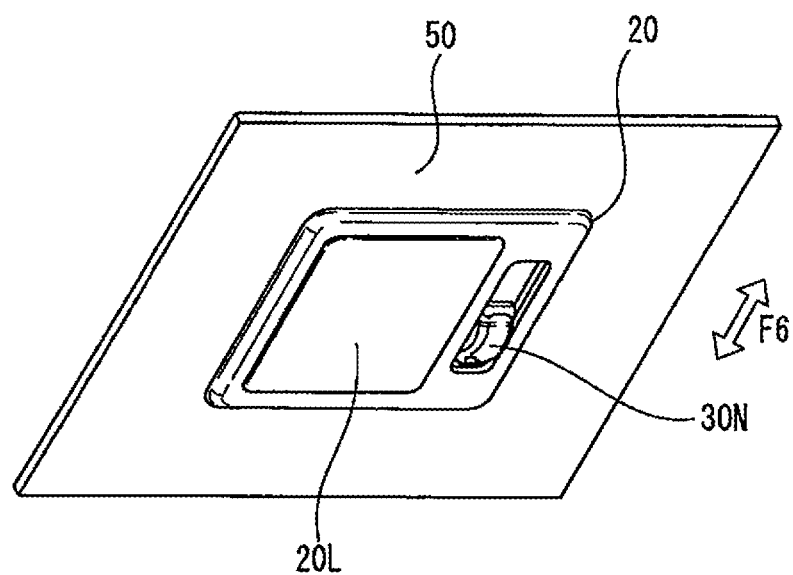
FIG. 5 is an oblique view illustrating the lamp of a type wherein the switch is arranged separately (Example 4).

Example 4 relates to an invention about the turning off of a lamp of the type having a separate switch. FIG. 5 is an oblique view illustrating such a lamp of the type having a separate switch (Example 4). The switch adopted in Examples 1-3 is turned on/off by the seesaw operation of the lens 20L itself. On the other hand, for the switch adopted in Example 4, as shown in FIG. 5, a conventional switch is used; a switch knob 30N separated from the lens 20L in the lamp 20 arranged in the roof portion housing 50 is arranged near the lens 20L. Here, the switch knob 30N is arranged so that the manipulating direction of the sun visor 10 (see FIG. 6C) is in the direction indicated by two arrows F6, and the lamp-turning-off protrusion 10N (see FIG. 6(C)) is driven to move as switch knob 30N (see FIG. 5 and FIG. 6(A)) is pressed due to the operation of the sun visor 10 when the sun visor 10 is stored.

Figure 6A:
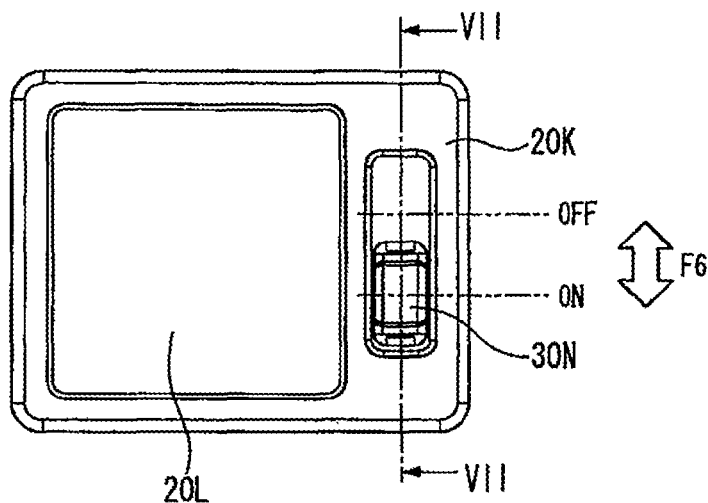
FIG. 6(A) through FIG. 6(C) illustrate the constitution of the invention in relation to Example 4.
Figure 6B:
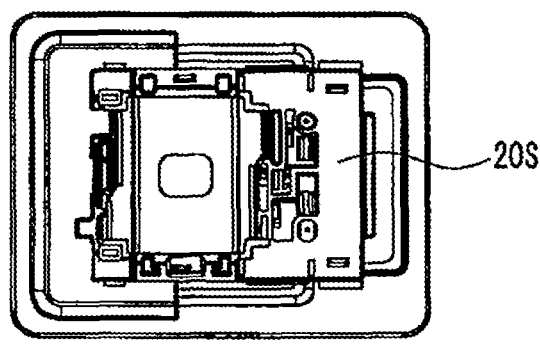
Figure 6C:
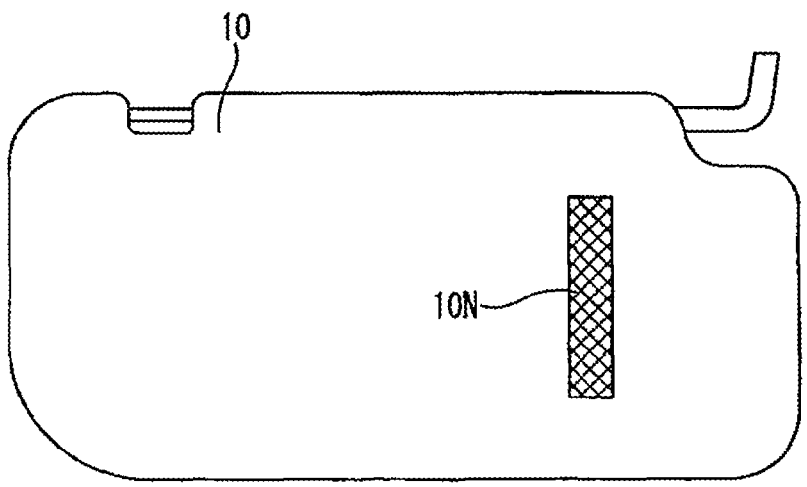
Figure 7A:
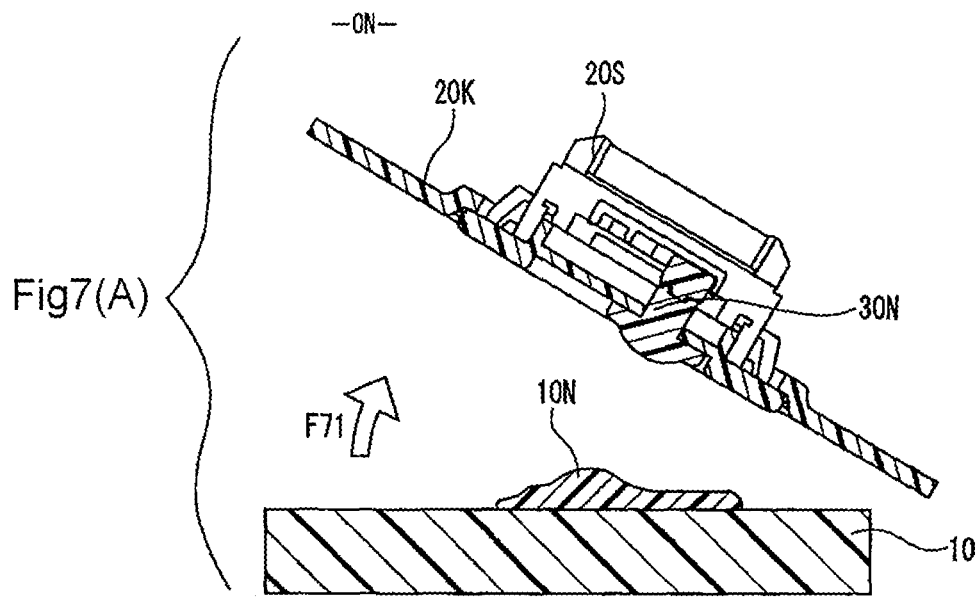
FIG. 7(A) and FIG. 7(B) are cross-sectional views taken across VII-VII in FIG. 6(A) illustrating the operation of the switch knob in relation to Example 4.
Figure 7B:
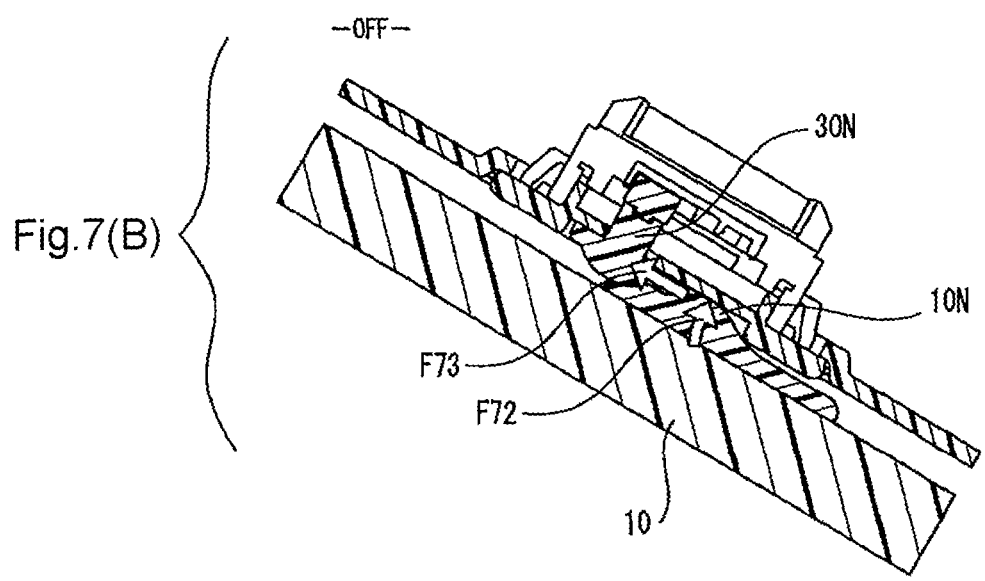

FIG. 6(A) through FIG. 6(C) illustrate the constitution of the invention in relation to Example 4 as shown in FIG. 5. FIG. 6(A) is a plane view illustrating the decorative surface of the lamp in relation to Example 4. FIG. 6(B) is a plane view illustrating the functional portion on the back surface of the decorated portion of the lamp. FIG. 6(C) is a plane view illustrating the state in which the sun visor is opened (in use). In addition, FIG. 7(A) and FIG. 7(B) are cross-sectional views taken across VII-VII in FIG. 6(A) illustrating the operation of the switch knob in relation to Example 4. FIG. 7(A) shows the state in which the sun visor is opened and FIG. 7(B) shows the state in which the sun visor is closed.

As shown in FIG. 6(A), the switch knob 30N arranged in the vicinity of the lens 20L is arranged in the housing 20K so that the lamp is turned on when the switch knob is at the lower position, and it is turned off when the switch knob is at the upper position. The functional part 20S arranged on the back side of the lens 20L (see FIG. 6(B)) works so that as the switch knob 30N is turned, the bulb is turned on when it is at the on position, and the bulb is turned off when it is at the off position. On the roof fitting surface of the sun visor 10 shown in FIG. 6(C), the lamp-turning-off protrusion 10N is arranged. The position for arranging the lamp-turning-off protrusion 10N is arranged at the position where the lamp-turning-off protrusion 10N comes in contact with the switch knob 30N when the sun visor 10 is stored at the prescribed position. A taper is formed on the lamp-turning-off protrusion 10N, and the lamp-turning-off protrusion 10N is formed in an appropriate shape so that it presses the switch knob 30N so that the switch knob 30N is pushed from the on position to the off position.

The sun visor 10 shown in FIG. 7(A) is in the opened state, and the switch knob 30N arranged in the housing 20K (see FIG. 6(A)) can be manipulated manually. As the switch knob 30N is lowered from the upper off position to the lower on position, the bulb 20V (see FIG. 6(A)) is turned on. In this case, the bulb 20V (see FIG. 6(A)) is turned on by the functional part 20S (see FIG. 6(B)). Because the sun visor 10 is in the opened state, as the switch knob 30N is manually raised to the upper off position, the bulb 20V can be turned off.

The sun visor 10 in the opened state moves on the rotating path in the direction indicated by arrow F71 to perform the closing operation. The lamp-turning-off protrusion 10N is arranged on the sun visor 10; when the sun visor 10 is stored at the prescribed position, the lamp-turning-off protrusion 10N makes contact with the switch knob 30N, then it is driven to move up due to the shape of the taper formed on the lamp-turning-off protrusion.

Consequently, when the sun visor 10 shown in FIG. 7(B) is rotated in the direction indicated by arrow F71 to the closed state, the lamp-turning-off protrusion 10N moves in the direction indicated by arrow 72. After it makes contact with the switch knob 30N, it further pushes the switch knob and, due to its tapered shape, the lamp-turning-off protrusion 10N is gradually pushed up to the OFF (off) position on the oblique upper side shown in the figure (in the direction indicated by arrow F73). Finally, the off state position is reached. As a result, the bulb 20V is turned off.

In this way, according to Example 4, the present invention is adopted in a lamp of the type having a separate switch. In this case, too, it is possible to carry out manual on/off of the lamp at will, and the lamp can be automatically turned off as the sun visor 10 is stored.

In the above, throughout Examples 1-4, the following features can be displayed in each of them: when illumination is needed, the lamp can be turned on manually and can also be turned off manually. Also, the lamp can be reliably turned off as the sun visor is stored. Consequently, there is no way that the lamp can remain on due to the driver forgetting to turn off the lamp. Since there is no momentary switch, no special switch is arranged in the circuit.

In addition, because the sun visor does not shift out slightly as would take place in the case of the momentary switch, it is possible to prevent the problem of re-turning-on of the bulb 20V.

Example 5

Hook-Attached Housing Supporting the End Portion Side of the Sun Visor

Figure 8:
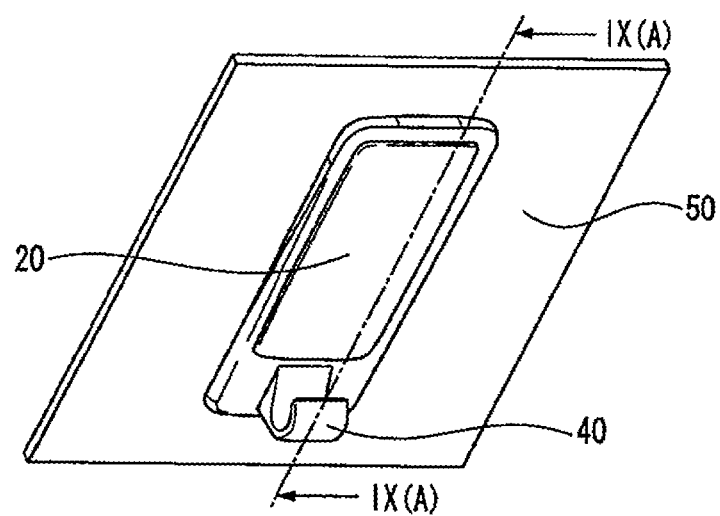
FIG. 8 is an oblique view illustrating the housing equipped with a hook supporting the end portion side of the sun visor in relation to Example 5 and a lamp concurrently used as a switch.

FIG. 8 through FIG. 10(B) illustrate Example 5. FIG. 8 is an oblique view illustrating the housing equipped with a hook supporting the end portion side of the sun visor in relation to Example 5 and a lamp concurrently used as a switch. FIG. 9(A) through FIG. 9(C) illustrate the structure of the hook that supports the end portion side of the sun visor and the lamp concurrently used as a switch in relation to Example 5. FIG. 9(A) is a cross-sectional view taken across IX(A)-IX(A) of FIG. 8 (vertical cross-sectional view). FIG. 9(B) is an oblique view illustrating the lamp when the lamp concurrently used as a switch is turned off. FIG. 9(C) is an oblique view illustrating the lamp when the lamp concurrently used as a switch is turned on.

The lamp concurrently used as a switch 20 shown in FIG. 8 has a switch function by the seesaw movement as it takes the horizontal posture or the inclined posture around the spindle at the center. As shown in FIG. 9(B), the lamp concurrently used as a switch 20 is off (turned off) when the lamp 20 (see FIG. 8) is in the horizontal posture 20h, and it is on (turned on) when the lamp 20 is in the inclined posture 20n as shown in FIG. 9(C). The lamp concurrently used as a switch 20 is arranged vertically as viewed by the driver. When the lamp 20 shown in FIG. 8 is in the horizontal posture (see FIG. 9(B)), the lamp is off. Next, as the end portion of the lamp 20 in the horizontal posture is pressed by a finger towards the roof side, it becomes the inclined posture (see FIG. 9(C)) and the lamp 20 is turned on. A hook 40 that supports the end portion side of the sun visor 10 is formed vertical to the vehicle in the roof portion housing 50 on the extension line in the length direction of the lamp 20 in a rectangular shape.

Figure 9A:
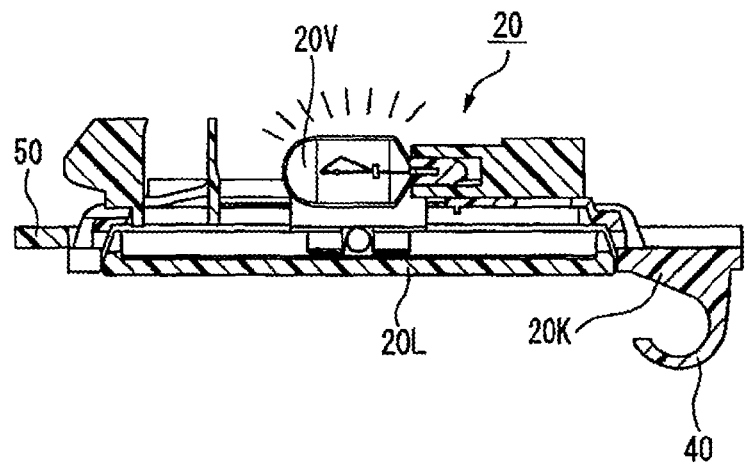
FIG. 9(A) through FIG. 9(C) illustrate the structure of the hook that supports the end portion side of the sun visor and the lamp concurrently used as a switch in relation to Example 5.
Figure 9B:
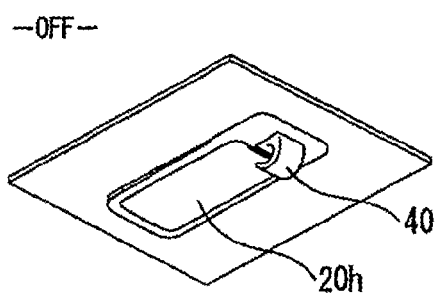
Figure 9C:
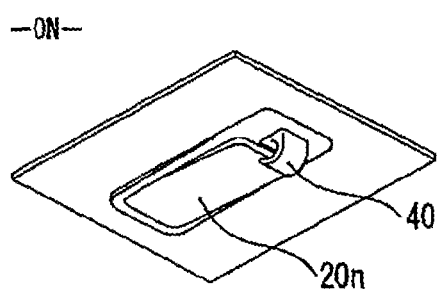

As shown in FIG. 9(A), the lamp 20 is anchored as the housing 20K is inserted towards the opening formed on the roof portion housing 50 with the lens 20L side facing down. A bulb 20V is arranged on the back side of the lens 20L. The lens 20L has a switch function and it can undergo seesaw movement with respect to the spindle. The hook 40 is arranged in the roof portion housing 50 near one end of the lens 20L and this hook has the end portion of the sun visor 10 engaged on it.

Figure 10A:
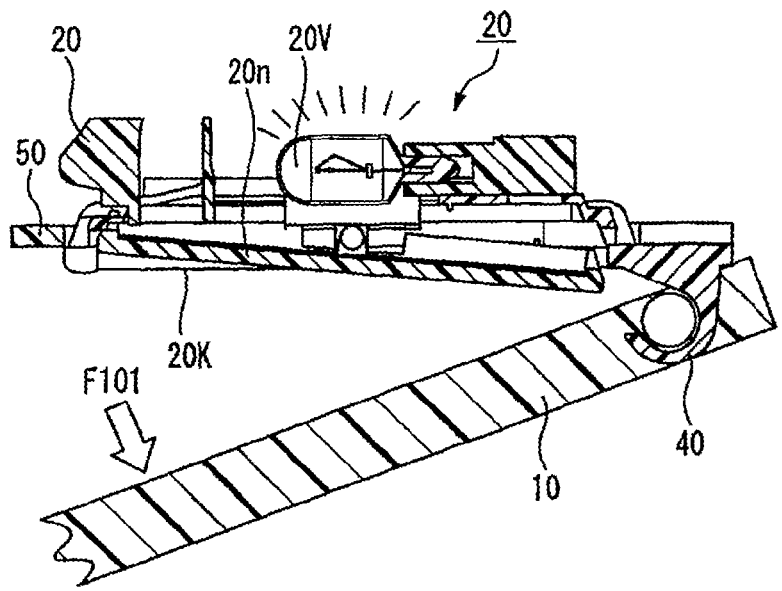
FIG. 10(A) and FIG. 10(B) are vertical cross-sectional views of the lamp and sun visor for illustrating the operation in Example 5.
Figure 10B:
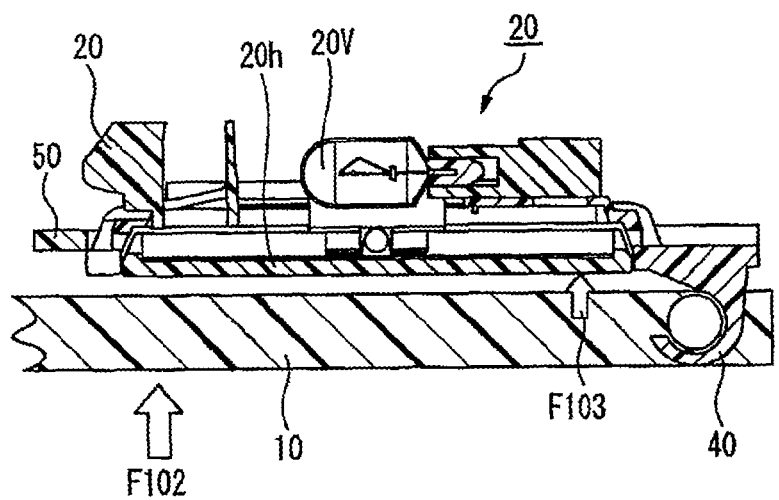

FIG. 10(A) and FIG. 10(B) are vertical cross-sectional views of the lamp and sun visor for illustrating the operation in Example 5. FIG. 10(A) shows the state in which the sun visor engaged with the hook is opened. FIG. 10(B) shows the state in which the sun visor engaged with the hook is closed. As shown in FIG. 10(A), the sun visor 10 has been rotated in the direction indicated by arrow F101 around the hook 40 at the center so that it is retreated from the lamp 20 and is in the opened state. In this state, the driver can use a finger to press the end portion of the lens 20L (see FIG. 9(A)). Here, if the finger presses the left end portion of the lens 20L, it changes from the horizontal posture to the inclined posture 20n shown in FIG. 10(A), and the bulb 20V is turned on.

If the finger presses the opposite side of the lens 20L, it resets the horizontal posture 20h and the bulb 20V is turned off.

Next, as shown in FIG. 10(B), as the sun visor 10 is rotated in the direction indicated by arrow F102 around the hook 40 at the center, it approaches the lamp 20 and the right end portion 20R of the lens 20L (see FIG. 9(A)) that shifts out from the decorative surface 20K is pushed back in the direction indicated by arrow F103 by the back side of the sun visor 10, so that it is reset to the horizontal posture and bulb 20V is turned off.

In Example 5, because the hook is integrally provided with the lamp concurrently used as a switch, attachment of the sun visor becomes simpler and when the sun visor is rotated to be stored at the prescribed position, the decorative surface of the lens can be reliably pressed, so that the lamp can be automatically turned off. In addition, as the sun visor is rotated backward to retreat, the lamp is exposed so that the lamp can be turned on/off manually at will.

Example 6

The Reversed Type Lamp with Respect to the On/Off Operation is Turned Off by the Sun Visor Engaged with the Hook FIG. 11(A) through FIG. 11(D) are the invention in relation to Example 6 and illustrate the principle of turning off of the lamp of the reversed type with respect to the on/off operation by the sun visor engaged with the hook. FIG. 11(A) is an overall oblique view of the lamp in the state in which the sun visor engaged with the hook is opened. FIG. 11(B) is a cross-sectional view of FIG. 11(A). FIG. 11(C) is an overall oblique view of the lamp in the state in which the sun visor engaged with the hook is closed. FIG. 11(D) is a cross-sectional view of FIG. 11(C). The lamp 20 adopted here is of a type reversed to the lamp 20 adopted in Example 5, that is, it is turned on (see FIG. 11A)) when in the horizontal posture (see FIG. 11(B)), and it is turned off (see FIG. 11(D)) when in the inclined state (see FIG. 11(C)).

The sun visor 10 shown in FIG. 11(B) and FIG. 11(D) differs from the sun visor 10 shown in FIG. 10(A) and FIG. 10(B) in the following features: (1) the feature that a protrusion 10T is arranged on the sun visor 10 and (2) the feature that a prescribed gap is arranged between the lens 20L and the sun visor 10 so that the lamp 20 can be inclined when pushed by the protrusion 10T. Here, the protrusion 10T of the sun visor 10 is arranged so that as it pushes the end portion of the lens in the horizontal posture 20h (on), the lamp becomes the inclined (off) state 20n.

Here, first of all, when the sun visor 10 retreats from the lamp 20 in the direction indicated by arrow F111, the lamp 20 becomes the opened state (see FIG. 11(B)). In this state, the end portion of the lamp can be manually pushed to become the horizontal posture 20h (see FIG. 11(A)), so that the bulb 20V is turned on. Similarly, when the sun visor 10 is in the retreated state and the lamp 20 is in the opened state, as the end portion on the opposite side of the lamp is manually pushed, it becomes the inclined posture 20n (see FIG. 11(C)) and the bulb 20V can be turned off.

When the sun visor 10 is pushed in the direction indicated by arrow F112 (see FIG. 11(D)) to approach the lamp 20, the left end portion of the lens 20L in the horizontal posture 20h (see FIG. 11(A)) is pushed in the direction indicated by arrow F113 by the protrusion 10T on the back side of the sun visor 10 (see FIG. 11(D)) and the lens 20L becomes the inclined posture 20n (see FIG. 11(C)), then the bulb 20V is turned off as shown in FIG. 11(D).

In Example 6 in which the reversed type lamp with respect to the on/off operation is handled, the hook is integrally provided with the lamp concurrently used as a switch, so that attachment of the sun visor becomes simpler; also, when the sun visor is rotated to be stored at the prescribed position, the protrusion can reliably push the decorative surface of the lens so that the lamp can be automatically turned off. Also, as the sun visor is rotated back to retreat so that the lamp can be exposed, the lamp can be turned on/off manually at will.

SUMMARY

According to the present invention explained above, the switch of the lamp can be driven to move physically from the on position to the off position by the sun visor when the sun visor is stored at the stored position. Consequently, it is possible to obtain an illuminating structure of a room lamp with the following merits: the lamp will not be left on because the user forgets to turn it off; while the sun visor is in use, the lamp can be turned on/off at will by a manual manipulation of the lamp itself; also, since there is no need to arrange an electric circuit in the sun visor arm portion, the structure is simper, problems hardly take place, and the cost can be cut.

What is claimed is:

1. An illuminating structure of room lamp, comprising:
   a sun visor that is arranged in a vehicle roof portion and that is rotatable between a working position and a stored position;
   a room lamp that is arranged in the vehicle roof portion and covered by the sun visor stored at the stored position; and
   a switch for turning on/off the room lamp and arranged on the room lamp or near it;
   wherein:
      the switch is turned between an on position and off position;
      when the switch is at the on position and the sun visor is stored at the stored position, the sun visor contacts the switch and the switch is physically turned from the on position to the off position;
      the switch is kept at the off position when the sun visor is rotated from the stored position to the working position;
      the switch is movable between the on position and the off position when the sun visor is placed at the working position;
      a protrusion is arranged on the sun visor;
      the switch includes a slide switch that can be turned between the on position and the off position; and
      when the sun visor is stored at the stored position, the protrusion turns the switch from the on position to the off position.

2. The illuminating structure of room lamp according to claim 1, wherein a hook that supports an end portion side of the sun visor is integrally provided with a same case as the switch.

* * * * *